United States Patent [19]

Williams et al.

[11] 4,422,715

[45] Dec. 27, 1983

[54] FIBER OPTIC CONNECTOR HAVING FIBER CUTTING MEANS

[75] Inventors: Russell H. Williams, Harrisburg, Pa.; Peter Garner, Flemington; K. Scott Gordon, Sergeantsville, both of N.J.

[73] Assignee: Thomas & Betts Corporation, Raritan, N.J.

[21] Appl. No.: 276,055

[22] Filed: Jun. 22, 1981

[51] Int. Cl.³ .............................................. G02B 7/26
[52] U.S. Cl. ................................ 350/96.20; 350/96.21
[58] Field of Search ............... 350/96.20, 96.21, 96.22; 29/469; 339/95 R; 225/23; 83/167; 30/42

[56] References Cited

U.S. PATENT DOCUMENTS

| | | | |
|---|---|---|---|
| 3,981,422 | 9/1976 | Moore | 225/2 |
| 4,158,476 | 6/1979 | McCartney | 350/96.21 |
| 4,181,402 | 1/1980 | Borsuk et al. | 350/96.21 |
| 4,182,017 | 1/1980 | Ford et al. | 350/96.21 |
| 4,229,876 | 10/1980 | Doty | 350/96.21 |
| 4,245,537 | 1/1981 | Curtis | 83/879 |
| 4,249,305 | 2/1981 | Basile | 30/164.9 |
| 4,367,011 | 1/1983 | Monaghan | 350/96.20 |

FOREIGN PATENT DOCUMENTS

| | | | |
|---|---|---|---|
| 2406211 | 6/1979 | France | 350/96.21 |
| 1425264 | 2/1976 | United Kingdom | |

OTHER PUBLICATIONS

Redmond, IBM Technical Disclosure Bull., vol. 22, No. 9, Feb. 1980, "Completely Integrated Fiber-Optic Link," pp. 3975-3976.

Ephraim et al., IBM Technical Disclosure Bull., vol. 22, No. 5, Oct. 1979, "Transceiver Module Assembly," pp. 2077-2078.

Cefarelli et al., IBM Tech. Disc. Bull., vol. 21, No. 4, Sep. 1978, "Optical Circuit Module Connector," pp. 1568-1570.

Uberbacher, IBM Tech. Disc. Bulletin, vol. 21, No. 12, May 1979, "Optical Fiber Cutting Tool," pp. 4947-4948.

Primary Examiner—John D. Lee
Assistant Examiner—Frank González
Attorney, Agent, or Firm—Robert M. Rodrick; Salvatore J. Abbruzzese

[57] ABSTRACT

A composite fiber cutting and terminating apparatus includes first and second housings supported for relative movement, the first housing supporting therein both a terminating device, such as a photodiode, and a cutting device. The second housing retentively engages an optical fiber. Upon relative movement of the housings, the fiber is initially cut to define a termination end face and the termination end face is thereafter placed in registration with the detention device.

33 Claims, 24 Drawing Figures

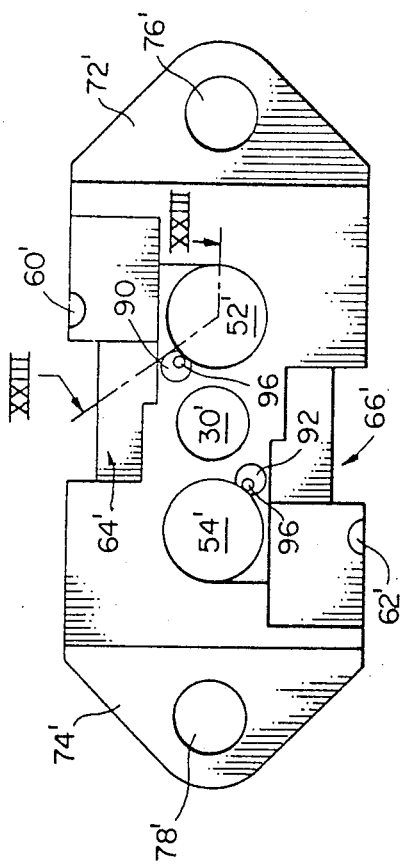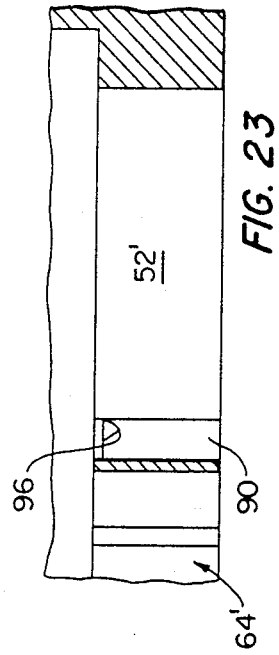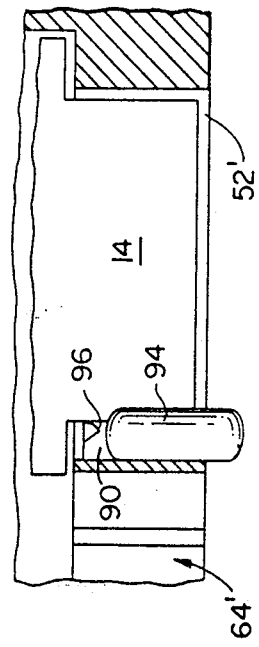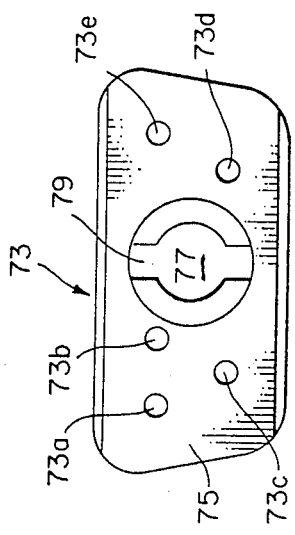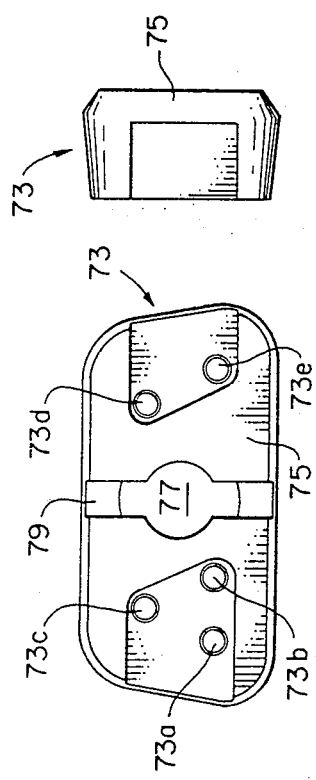

FIBER OPTIC CONNECTOR HAVING FIBER CUTTING MEANS

FIELD OF THE INVENTION

This invention relates generally to fiber optic connectors and pertains more particularly to apparatus and methods for cutting and terminating optical fibers.

BACKGROUND OF THE INVENTION

In typical usage of optical fibers, occasion arises frequently for field termination of fibers, i.e., connection thereof to one of several different types of termination devices, e.g., another fiber, or a lightgenerating electrical transducer such as a light-emitting diode (LED), or a transducer responsive to light energy to provide electrical output such as a photoelectric diode, etc.

As is evidenced by various presently available commercial products for this purpose, the task of field termination is labor-intensive, at the least. Considering plastic optical fibers, which comprise a core, a cladding about the core and an outer jacket, one is led by product instructions initially to remove the jacket, as by stripping, for a specified distance from an end of the fiber. Caution need be taken in the stripping operation, lest the cladding be disturbed. One is advised to pass light through the stripped fiber to confirm that no light spots are observed in the cladding, which would require discarding the stripped portion of the fiber and a repeat effort at jacket removal.

Following jacket stripping, the assembler is led into the end finishing phase. Here, the fiber is inserted retentively in a suitable housing and is thereafter cut to length by use of razor blade, hot knife, guillotine cutter or rotary inscriber apparatus. The termination end face of the fiber, now defined, is subjected to polishing. Finally, one reaches the mechanical assembly stage wherein the prepared fiber in such housing is placed in another compatible housing supporting a termination device for registering the fiber termination end face with the termination device.

The art has heretofore consistently addressed separately the phases of fiber preparation and termination, i.e., without bridging of activity in one phase into the other. Thus, patents exist in substantial number directed solely to apparatus for effecting registration of a prepared fiber with a termination device and in goodly number directed solely to cutting devices and fixtures for fiber preparation.

SUMMARY OF THE INVENTION

The present invention has as its primary object the provision of apparatus and method for rendering less labor-intensive the field termination of optical fibers.

A further object of the invention is to provide a bridge as between the heretofore separately addressed phases of fiber preparation and termination.

An additional object of the invention is to provide improved component parts of fiber optic connectors.

In attaining these and other objects, the invention provides a fiber optic connector or component thereof wherein devices for retentive engagement and separation of a fiber are supported for relative movement in one or more housings. A fiber termination end face is defined by the separation device in the course of such relative movement and, in a single housing embodiment, the housing has terminating registry surface adjacent to the fiber termination end face, whereby registration of the end face and a termination device, e.g., and LED, may be effected.

In particularly preferred practice in accordance with the invention, a cutting device and a termination device are supported in fixed mutual relation, i.e., in a common housing adapted for receiving the fiber and dispensing therefrom the fiber remnant to be cut. A companion housing provides the above-noted retentive engagement of the fiber. The respective housings are joinable in a first pre-cutting relation, are mutually movable into a second relation effecting fiber cutting, and are further mutually movable into a third relation providing registry of the termination end face resulting from the cutting and the termination device. The apparatus comprised of the common and companion housings remains in place, constituting a connector.

In a further aspect of the invention, a separation device adapted for forming a fiber termination end face and for disposition in optically non-interfering relation to such fiber termination end face, remains as a situate member of the connector in its use.

In its method aspects, the invention provides for the retentive engagement of a fiber at a location spaced from an end of the fiber, and successive displacements of the retained fiber in a predetermined path to effect the formation of a termination end face of the fiber at such location and registry of the termination end face and a termination device.

The foregoing and other features and aspects of the invention will be further evident from the following detailed description of embodiments thereof and from the drawings which depict particularly preferred embodiments of apparatus and methods for practicing the invention.

DESCRIPTION OF THE DRAWINGS

FIG. 8 is a sectional view of the fiber holder as seen from the plane VIII—VIII of FIG. 5.

FIG. 13 is a front elevation of a termination device support insulator for insertion rearwardly in the leftward housing of FIG. 1.

FIG. 14 is a top plan view of the insulator of FIG. 13.

FIG. 15 is a rear elevation of the FIG. 13 insulator.

FIG. 16 is a side elevation of the FIG. 15 showing.

FIG 22 is a front elevation of an alternative embodiment of the leftward housing of FIG. 1 wherein index-matching medium is containable for use.

FIG. 23 is a partial sectional view of the FIG. 22 housing as seen from broken plane XXIII—XXIII of FIG. 22.

FIG. 24 is a repetition of FIG. 23 with an index-matching medium capsule and a termination device shown in place.

Figure 1:
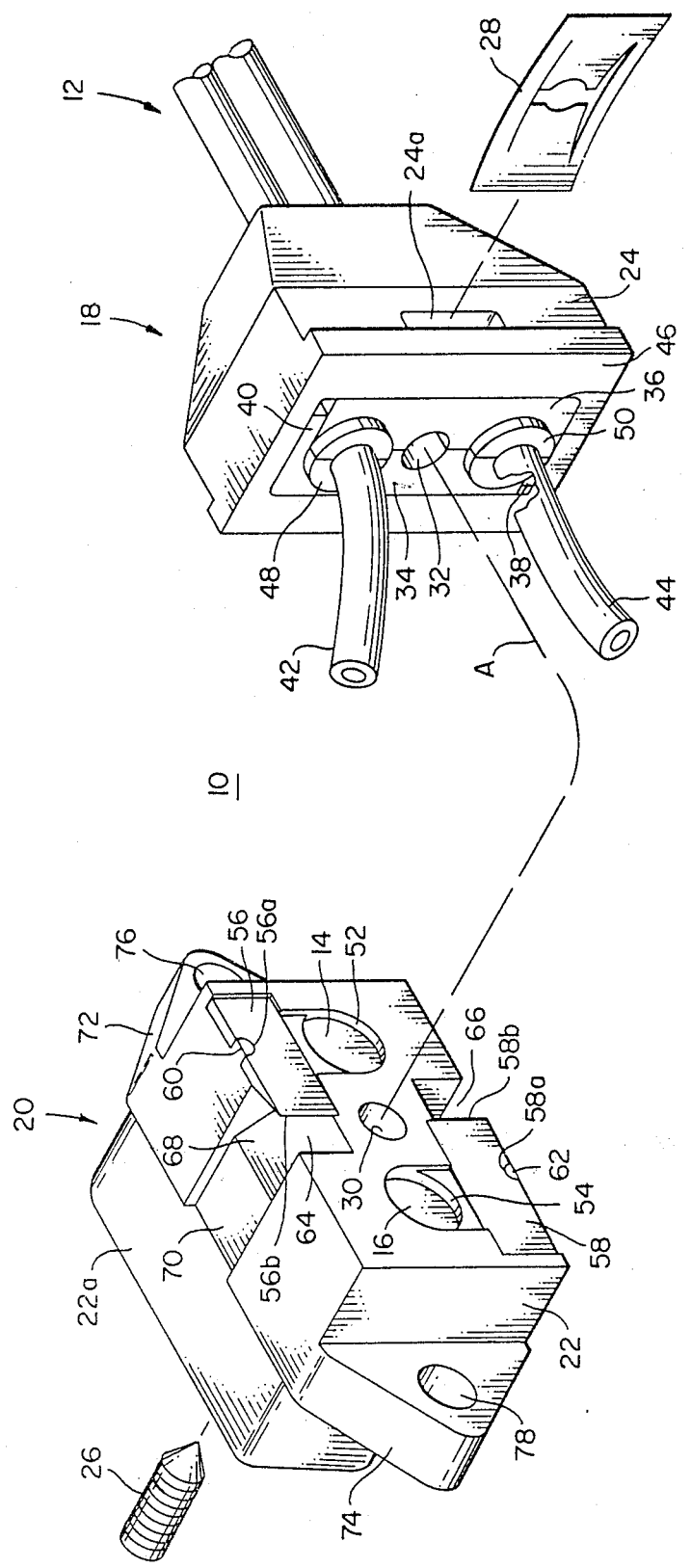
FIG. 1 is an exploded perspective view of cooperative housings for use in practicing the invention, the leftward housing supporting cutting and termination devices and the rightward housing supporting optical fibers.

DESCRIPTION OF PREFERRED EMBODIMENTS AND PRACTICES:

Referring to FIG. 1, apparatus 10 for termination of fiber optic duplex cable 12 to termination devices, such as LED 14 and photodiode 16, employs cooperative housings 18 and 20, preferably constituted of rigid material, e.g., zinc having a nickel finish, in the case of support body 22 of housing 20 and outer shell 24 of housing 18. The housings are joinable along axis A and are mutually secured and supported for relative movement, both rotative and translational, by threaded bolt 26 and metal clip nut 28. Nut 28 is insertable through shell slot 24a and is accessible to bolt 26 upon bolt passage through opening 30 of housing 20 and opening 32 of housing 18.

Housing 18 includes holders 34 and 36, interfittable with one another by sideward legs 38 and 40 and corresponding grooves receiving the legs, for guiding individual optical fibers 42 and 44 of cable 12 through housing 18 and into the illustrated disposition thereof. Thus, the fibers issue individually from mutually spaced embossments 48 and 50, jointly formed by the holders and protruding outwardly of the common plane of residence of shell front face 46 and the front faces of holders 34 and 36.

Housing 20 includes an internal cavity, discussed below, which communicates with termination device residence channels 52 and 54, each of which has a radius of curvature at its circular expanse which is slightly in excess of the identical radii of curvature of embossments 48 and 50, the channels being also spaced mutually identically with the embossment mutual spacing, such that the embossments may register snugly within channels 52 and 54 when the housings are rotated collectively through ninety degrees and joined by longitudinal movement along axis A.

Oppositely adjacent to channels 52 and 54, housing 20 includes cutting devices 56 and 58, respectively, which may take the form of blades nestably securable in housing 20 by interference fit of blade detents 56a and 58a with housing lugs 60 and 62. Alternatively, the cutting devices may be formed integrally with body 22.

Fiber receiving zones 64 and 66 are provided in housing 20, respectively adjacent the cutting surfaces 56b and 58b of the cutting devices. In the case of each such fiber receiving zone, as can be seen for zone 64 in FIG. 1, an inclined fiber support/guide surface is provided at 68, communicating rearwardly with indented flat surface 70. Side flanges 72 and 74 of body 22 include apertures 76 and 78.

Figure 3:
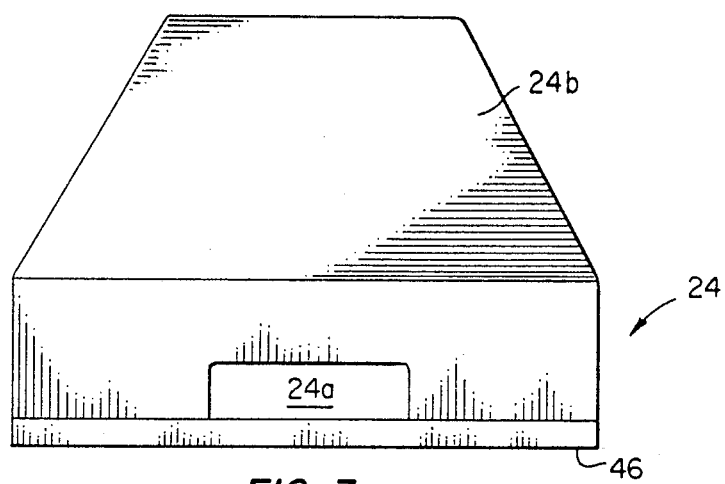
FIGS. 2, 3 and 4 are respective front, top plan and side elevations of the outer shell of the rightward housing of FIG. 1.
Figure 2:
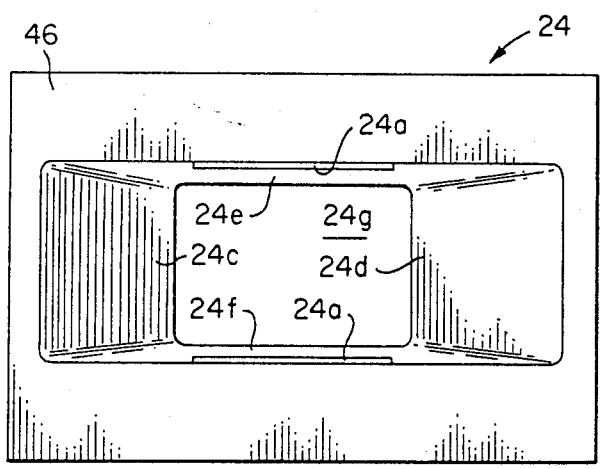
Figure 4:
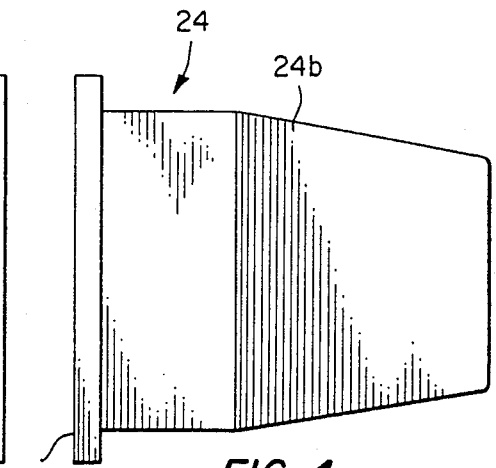
Figures 5, 6, 7:
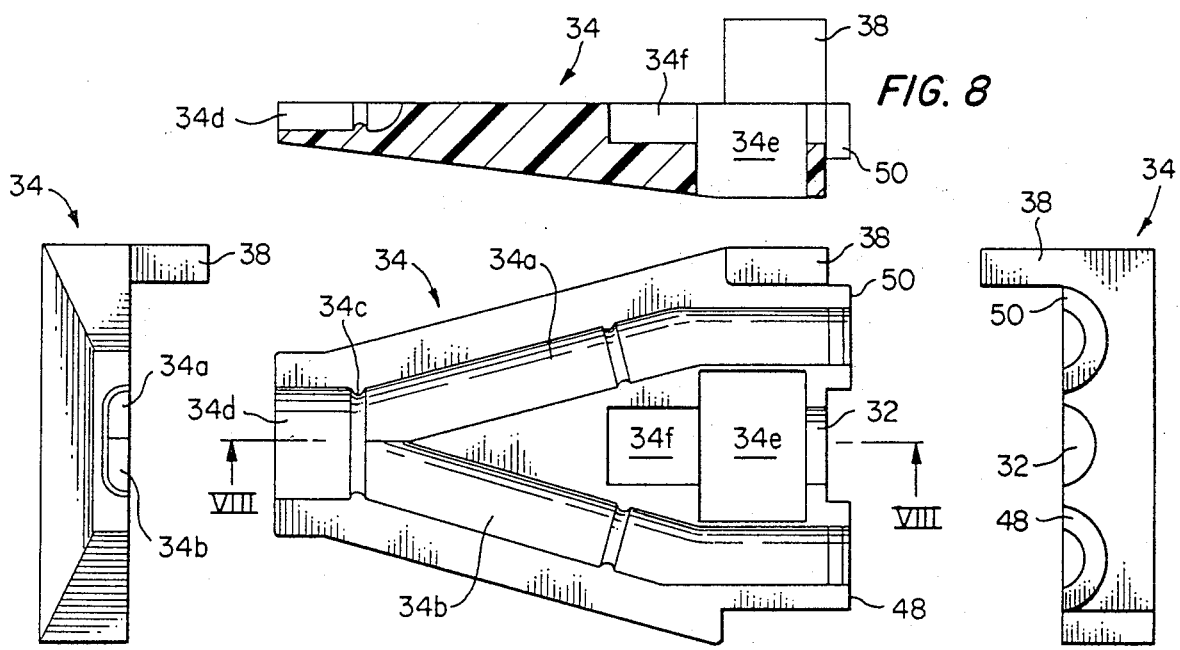
FIGS. 5, 6 and 7 are respective top plan, left side and right side elevations of one of the fiber holders seated in the rightward housing of FIG. 1.

Structural detail of the embodiment of the invention detailed in the drawings will now be covered prior to discussion of the progressive dispositions of the FIG. 1 housings in use thereof. In this connection, reference is now invited to FIGS. 2-4, which set forth the structure of shell 24 of housing 18. Slot 24a will be seen to be a through slot, whereby clip 28 (FIG. 1) is situated fully in registry with opening 32 of holders 34 and 36. The shell is configured in rearward tapered arrangement 24b, which has interior sidewalls 24c and 24d and interior top and bottom walls 24e and 24f, collectively bounding fiber holder confining central recess 24g of shell 24.

Fiber holders 34 and 36 (FIG. 1) are identically configured, each having a respective leg 38 and 40 and corresponding grooves, the structure of holder 34 being detailed in FIGS. 5-8, to which reference is now had. Holder 34 is preferably of plastic material having a high coefficient of friction and in which are defined guide passages 34a and 34b for receiving, displacing and strain-relief retaining of fibers 42 and 44, respectively, of FIG. 1. Given the exemplary duplex cable construction, fibers 42 and 44 are split apart and "snaked" through the holders, being frictionally engaged at various locations, e.g., as at 34c, by the plastic holder material. A collective entry area is afforded or both fibers at 34d. The holders jointly define area 34e for receipt of clip 28 (FIG. 1) and a recess 34f for bolt 26 (FIG. 1). Also jointly defined by the holders are embossments/protuberances 48 and 50 and bolt opening 32.

Figure 9:
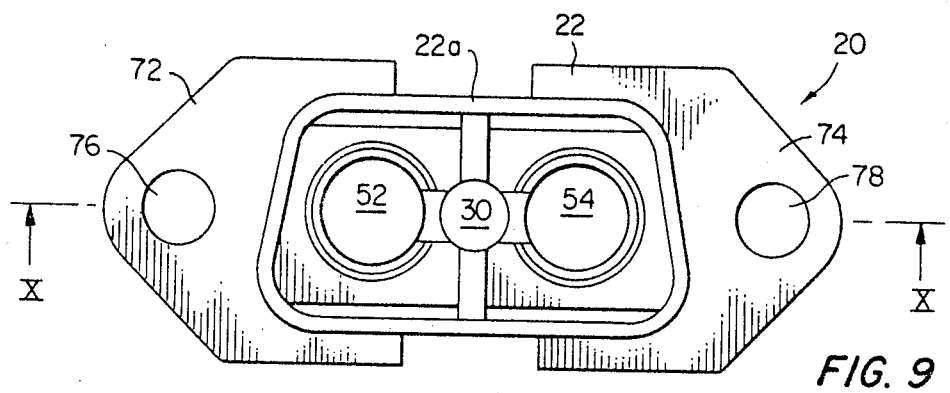
FIG. 9 is an elevation of the leftward FIG. 1 housing as it would be seen from a location leftwardly thereof in FIG. 1.
Figure 10:
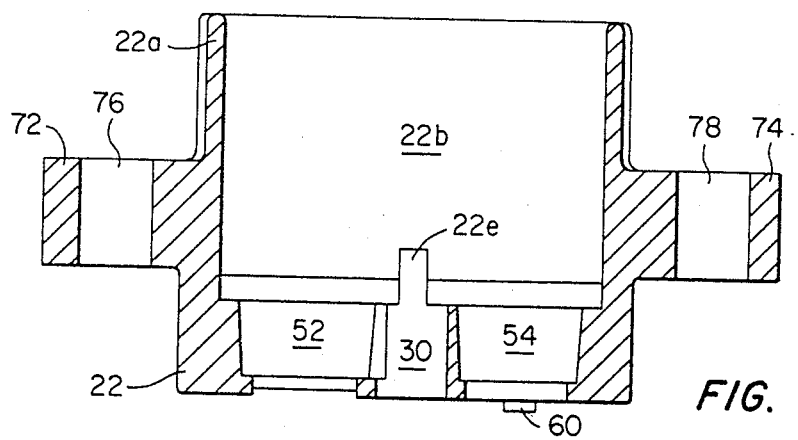
FIG. 10 is a sectional view of the leftward housing of FIG. 1 as seen from the plane X—X of FIG. 9.

Referring to FIGS. 9 and 10, body 22 of housing 20 has an open rearward portion 22a defining cavity 22b, above referenced, for receipt of termination devices 14 and 16 (FIG. 1) and an electrically insulative support member to be discussed below in connection with FIGS. 13 through 16. Frontally of cavity 22b are structures for containing the termination devices in channels 52 and 54 and for definition of bolt passage 30.

Figure 12:
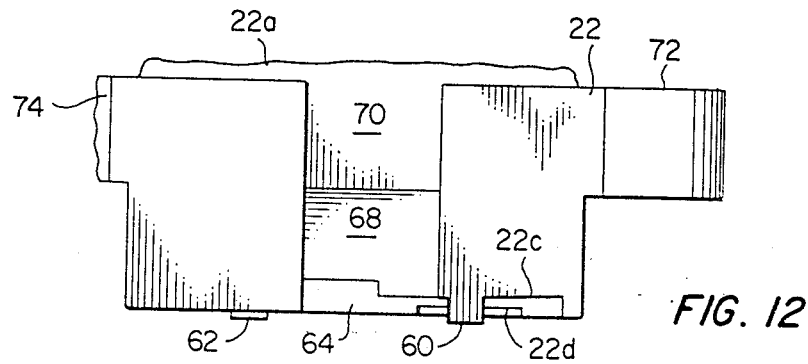
FIG. 12 is a partial plan elevation of the FIG. 11 showing.
Figure 11:
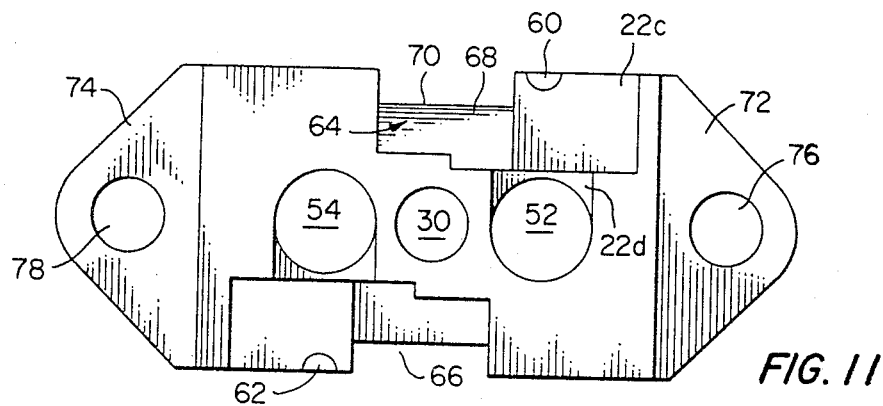
FIG. 11 is a front elevation of the leftward housing of FIG. 1.

FIGS. 11 and 12 provide insight into particularly preferred structure for body 22. In order to insure that fibers cut by cutting edges 56b and 58b (FIG. 1) and, more specifically, termination end faces thereby provided in the fibers, are not disposed contiguously with housing 22 structure following cutting, housing 22 defines blade orientating surface 22c in rearwardly inclined fashion. Thus, upon fiber cutting, the blade is inclined to be noncontiguous with respect to the fiber termination end face. Further, by virtue of the rearward recessing of housing surface 22d, adjacently below the recessed cutting device, one is assured that the termination end face achieved upon interference path engagement of the fiber and the cutting device will be maintained in non-contiguous relation with the support housing until such time as the end face is in registry with the termination device.

FIGS. 13 through 16 depict insert structure for use in supporting termination devices within cavity 22b of housing 22 (FIG. 10). More particularly, termination device support insulator 73 is an electrically insulative body 75 defining a central aperture 77 facilitating passage of joinder and housing movement support bolt 26 (FIG. 1) therethrough, and an opening 79 for engaging housing member 22e (FIG. 10). Openings 73a-73c are provided for guidance of leads of photodiode 16 outwardly of housing 20. Likewise, openings 73d and 73e guide leads of LED 14 from the housing.

Given the detailed structure of the embodiment of FIGS. 1 through 16, reference is now made to FIGS. 17 through 21 for further understanding of the operation and use thereof.

Figure 17:
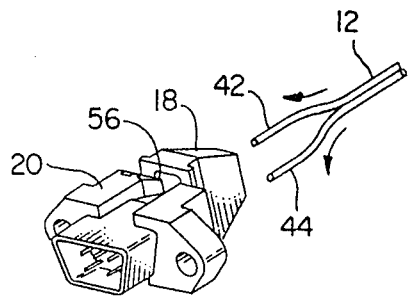
FIGS. 17 through 21 are perspective views of the FIG. 1 housings in successive stages of assembly, relative orientation and use.
Figure 18:
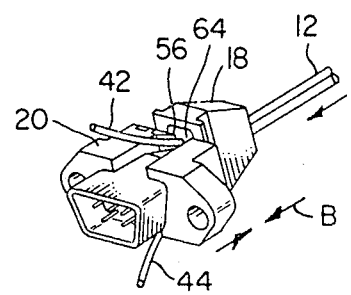
Figure 19:
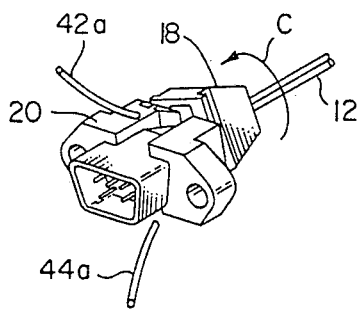

In FIG. 17, cable 12 is shown prepared, as by splitting fibers 42 and 44 apart, for use individually in connection with housings 18 and 20. In the example at hand, wherein plastic fibers are being considered, removal of cable jacketing material is not required. Holders 34 and 36 are relatively loosely contained in shell 24 and, in FIG. 18, the fibers are snaked into the holders and emerge from embossments 48 and 50 to reside in zones 64 and 66 of housing 20. As will be observed, housings 18 and 20 are disposed in FIGS. 17 and 18 such that the line of alignment/spacing of embossments 48 and 50 is orthogonal to the line of alignment/spacing of channels 52 and 54. Prior to placement of the fibers in their respective zones in housing 20, holders 34 and 36 are pressed into shell 24 and thereby into tight retentive engagement with fibers 42 and 44. The housings are then advanced longitudinally, i.e., along the longitudinal axis of the elongate fibers of cable 12, mutually toward one another as indicated by arrows B in FIG. 18.

Next, housings 18 and 20 are rotatively displaced in a mutual closing direction. Thus, if housing 20 is considered stationary, housing 18 is rotated counterclockwise relative thereto, as indicated by arrow C in FIG. 19. The fibers are thereby moved in a predetermined invariant locus as defined by the physical structure of the housing 18 and the movement of the housing 18 about an axis defined by the bolt 26. Such movement is arcuate or rotative in the practice being discussed and the fibers are brought into engagement with cutting surface of the cutting devices at locations distal from ends of the fibers at which they are retentively engaged, providing a termination end face at each such location. As the zones for cutting are juxtaposed with exterior surface of housing 20, the fiber remnants which have been cut, i.e., segments 42a and 44a, are freely dispensed from the assembly. With the fibers displaced in such predetermined locus in the example, the fiber termination end faces continue in a circular locus into registry with the active surfaces of the termination devices upon continued rotation of the fibers, such continuance of displacement of the housings and hence the fibers being shown in FIG. 20.

Figure 20:
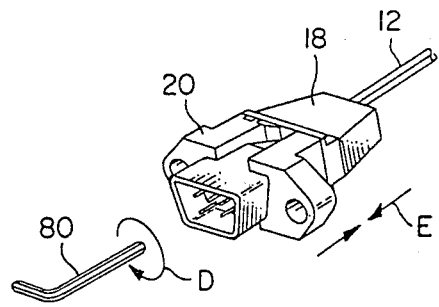
Figure 21:
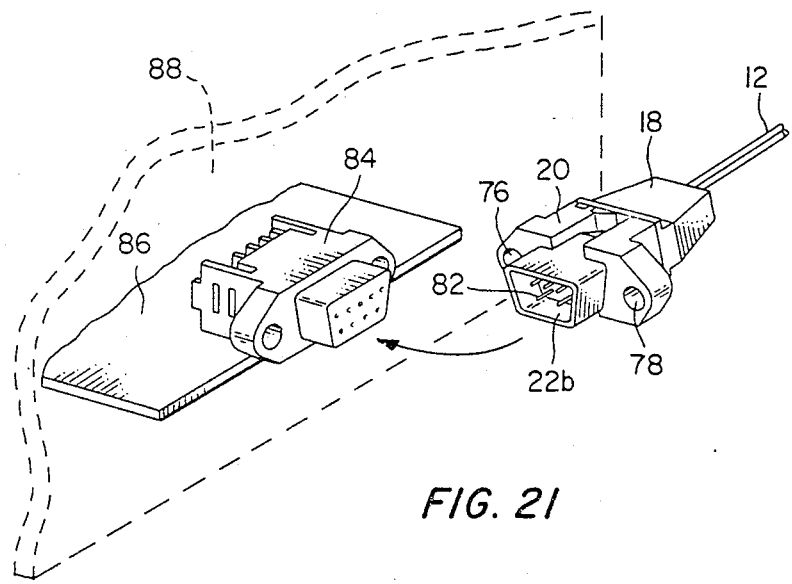

As also shown in FIG. 20, housings are advanced mutually longitudinally, i.e., are mutually translated, as by tightening of bolt 26 through rotation of hex wrench 80, in direction D, giving rise to housing relative movement in direction E along the longitudinal axis of the elongate fibers, effecting tight insertion of embossments 48 and 50 within channels 52 and 54 (FIG. 1) and intimate contact of the fiber termination end faces with the active surfaces of termination devices 14 and 16.

The completely assembled connector (FIG. 21) includes electrical pins 82, connected electrically with the leads of the termination devices and extending outwardly of housing cavity 22b for separable connection with socket contacts of companion electrical connector 84 supported on such as printed circuit board 86 of accessory apparatus 88. As will be appreciated, the optical/electrical interface within the composite connector defined by secured housings 18 and 20 is intended as an effective permanent interface, whereas separability is readily afforded at the electrical interface of pins 82 and the sockets of connector 84.

While it is found to be unnecessary to "polish" or otherwise finish termination end faces provided by such relative movement of housings forming a connector in accordance with the invention, the invention contemplates the provision of index-matching medium on either the fiber end face or the termination device, or both.

Reference is made to the alternative embodiment of the housing of FIG. 11, shown at 20' in FIG. 22. For convenience, parts of housing 20' having correspondence with parts of the FIG. 11 housing above discussed, have corresponding primed reference numerals. Adjacent to channels 52' and 54' are located wells 90 and 92, respectively, for the seating of capsules containing index-matching fluid, one such capsule being shown at 94 in FIG. 24.

As is shown in FIGS. 22, 23 and 24, well 90 communicates with channel 52', such that capsule 94 emerges sidewardly outwardly of well 90 to be compressively engaged by termination device 14. At its interior seat, well 90 includes piercing member 96, effective to pierce and open capsule 94 upon relative movement of housing 20' and housing 18 in manner shown at B in FIG. 18. The fluid content of the capsule thereupon issues into channel 52' whence it serves to provide an interface for termination device 14 and fiber 42 as the housings thereof are moved into their FIG. 20 dispositions.

In the depicted embodiments, plural housings are shown, with the cutting device supported in one housing in fixed relation to the termination device, and the fibers supported in another housing defining terminating registry surface in the form of embossments 48 and 50 adjacent to the fiber termination end faces. As previously alluded to, the invention may be practiced with a single housing, wherein the fiber is retentively engaged and the cutting device supported for movement into engagement with the fiber for cutting, nicking or like separation to define the termination end face. The single housing will include terminating registry surface, such that the component part of a connector thus provided may have its fiber termination end face placed in registry with a separately housed termination device through the use of such single housing registry surface.

In its several aspects, the invention contemplates a bridging method as between fiber preparation for termination and termination itself, apparatus for both cutting and terminating a fiber, a fiber optic connector for both separating and terminating a fiber, a fiber optic connector component part for separating a fiber to render same readily field-terminatable and a separation device in a fiber optic connector that remains as a situate member in use of the connector.

Various changes to the particularly disclosed and depicted embodiments will now be evident to those skilled in the art. For example, while the invention has been discussed in connection with the joint termination, by simultaneous end face creation for plural fibers, the invention is of course both addressed to individual fiber termination and to the successive cutting and termination of plural fibers. It will also be understood that the rotative and translational mutual movement of housing parts is exemplary and that other movement is within the contemplation of the invention. Likewise, although discussion has been had particularly of the cutting and termination of plastic fibers, skilled artisans will appreciate the ready adaptation of the invention to other varieties of optical fibers. Also, while the term "cutting" has been used above and separation of fibers to form termination end faces has been by cutting in an interference path fully through the fibers, those skilled in the art will recognize other fiber separation practices, e.g., surface nicking of a fiber and subsequent pulling to effect separation and termination end face formation. Accordingly, as used herein, the term "separation" is intended to mean the division of a fiber into parts.

The particularly disclosed and depicted embodiments of the invention are thus intended in an illustrative and not in a limiting sense. The true spirit and scope of the invention is set forth in the following claims.

What is claimed is:

1. In a fiber optic connector, the improvement comprising, as a situate member of said connector in use: a separation device adapted for forming a fiber termination end face and for disposition in optically non-interfering relation to said fiber termination end face.

2. A fiber optic connector component including means for retentively engaging a fiber, separation means for defining a termination end face for said fiber, and housing means for supporting such fiber engaging means and said separation means for relative movement, said housing means defining terminating registry surface adjacent said fiber termination end face, whereby said termination end face may be placed in registration with a termination device by said housing means.

3. The connector component claimed in claim 2 wherein said separation means comprises a cutting blade.

4. The connector component claimed in claim 3 wherein said housing means support said fiber engaging means and said separation means for relative movement in an interference path such that said cutting blade fully cuts through said fiber in definition of said termination end face.

5. In combination, in a fiber optic connector:
   (a) means for retentively receiving an optic fiber;
   (b) fiber cutting means;
   (c) a fiber termination device; and
   (d) means for supporting said fiber receiving means, said fiber cutting means and said fiber termination device for relative movement to effect cutting of said fiber to define a termination end face therefor and to provide subsequent registry of said termination end face and said termination device.

6. The invention claimed in claim 5 further including means for applying index-matching medium to said termination end face of said fiber.

7. The invention claimed in claim 5 wherein said means for supporting comprises a first housing for supporting said cutting device and said termination device in fixed mutual relation therein and a second housing for supporting said fiber receiving means.

8. The invention claimed in claim 7 wherein said cutting device comprises a blade member support in said first housing.

9. The invention claimed in claim 7 wherein said first housing defines a zone for receipt of said fiber adjacent exterior surface of said first housing, whereby the cut portion of said fiber may be dispensed from said first housing upon such cutting thereof.

10. The invention claimed in claim 7 wherein said means for supporting further includes joinder means engageable with said first and second housings for supporting first relative movement thereof to engage said fiber with said cutting device and provide said termination end face for said fiber and for supporting second relative movement of said first and second housings to place said termination end face in registry with said termination device.

11. The invention claimed in claim 10 wherein said joinder means support said first and second housings for relative rotative movement.

12. The invention claimed in claim 11 wherein said joinder means further supports said first and second housings for relative translational movement.

13. A fiber optic connector for termination with a termination device, comprising in combination:
   (a) first housing means including separation means thereon;
   (b) second housing means for retentively engaging said fiber; and
   (c) means coupling said first and said second housing means for movement relative to each other to effect separation of a portion of said fiber during such relative movement of said first and second housing means, a retentively engaged portion of said separated fiber defining an end face for termination with a termination device.

14. The fiber optic connector claimed in claim 13 wherein said separation means comprises a cutting member disposed for full traversal through said fiber to thereby effect fiber separation.

15. A method for cutting an optical fiber and registering such cut fiber with a termination device, comprising the steps of:
   (a) retentively engaging said fiber in preselected manner at a location spaced from an end of said fiber;
   (b) displacing such retained fiber in a predetermined locus to cut said fiber to define a termination end face for said fiber at said location; and
   (c) while continuing such retention of said fiber in said preselected manner, further displacing said fiber in said predetermined locus to dispose said termination end face and said termination device in mutual registry.

16. The method claimed in claim 15 wherein said preselected manner is that of circumscribingly engaging said fiber over an expanse thereof extending from said location oppositely from said end of said fiber.

17. The method claimed in claim 15 wherein said fiber is selected to have elongate extent and including the further step of advancing said fiber longitudinally toward said termination device following such displacement of said fiber.

18. The method claimed in claim 15 including the further step of applying index-matching medium to either or both of said termination end face and said termination device.

19. The method claimed in claim 15 including the further step of applying index-matching medium to said termination end face following practice of said step (b).

20. The method claimed in claim 15 wherein said steps (b) and (c) are practiced by successive displacements of said fiber in an arcuate path constituting said predetermined locus.

21. The method claimed in claim 20 wherein said termination end face of said fiber is displaced in a circular locus in said practice of said step (c).

22. A method for cutting an optical fiber with a cutting device and registering such cut fiber with a termination device, comprising the steps of:
   (a) supporting said cutting device and said termination device in fixed mutual relation;
   (b) retentively engaging said fiber at a location spaced from an end of said fiber;
   (c) disposing said cutting device in interference path with said fiber at said location therein; and
   (d) while maintaining such retentive engagement of said fiber, displacing said fiber and said cutting device relative to one another to cut said fiber at said location to thereby define a termination end face for said fiber and continuing such displacement until said termination end face and said termination device are in mutual registry.

23. The method claimed in claim 22 wherein said fiber is selected to have elongate extent and including the further step of advancing said fiber longitudinally toward said termination device following such displacement of said fiber.

24. The method claimed in claim 22 including the further step of applying index-matching medium to either or both of said termination end face and said termination device.

25. The method claimed in claim 22 including the further step of applying index-matching medium to said termination end face following such cutting of said fiber.

26. The method claimed in claim 22 wherein said step (d) is practiced by successive displacement of said fiber in a predetermined locus.

27. The method claimed in claim 26 wherein said termination end face of said fiber is displaced in a circular locus in said practice of step (d).

28. Apparatus for cutting an optical fiber with a cutting device and terminating same with a termination device, comprising:
   (a) first housing means for supporting said cutting device and said termination device therein;
   (b) second housing means for retentively engaging said fiber; and
   (c) joinder means engageable with said first and second housing means for effecting first relative movement thereof to engage said fiber with said cutting device and provide a termination end face for said fiber and for effecting second relative movement of said first and second housing means to place said termination end face in registry with said termination device.

29. The apparatus claimed in claim 28 wherein said cutting device comprises a blade member supported in said first housing means.

30. The apparatus claimed in claim 28 further including means for applying index-matching medium to said termination end face of said fiber.

31. The apparatus claimed in claim 28 wherein said first housing means defines a zone for receipt of said fiber adjacent exterior surface of said first housing means, whereby the cut portion of said fiber may be dispensed from said first housing means upon such cutting thereof.

32. The apparatus claimed in claim 28 wherein said joinder means supports said first and second housing means for relative rotative movement.

33. The apparatus claimed in claim 32 wherein said joinder means further supports said first and second housing means for relative translational movement.

* * * * *